(12) United States Patent
Bolotskikh et al.

(10) Patent No.: US 12,242,235 B2
(45) Date of Patent: Mar. 4, 2025

(54) SUMMARIZATION RETRIEVAL IN A PROCESS CONTROL ENVIRONMENT

(71) Applicant: AVEVA SOFTWARE, LLC, Lake Forest, CA (US)

(72) Inventors: Alexander Vasilyevich Bolotskikh, Ladera Ranch, CA (US); Vinay T. Kamath, Rancho Santa Margarita, CA (US); Yevgeny Naryzhny, Foothill Ranch, CA (US); Abhijit Manushree, Laguna Niguel, CA (US)

(73) Assignee: Aveva Software, LLC, Lake Forest, CA (US)

( * ) Notice: Subject to any disclaimer, the term of this patent is extended or adjusted under 35 U.S.C. 154(b) by 99 days.

(21) Appl. No.: 18/077,600

(22) Filed: Dec. 8, 2022

(65) Prior Publication Data
US 2023/0244203 A1    Aug. 3, 2023

Related U.S. Application Data

(63) Continuation of application No. 16/732,956, filed on Jan. 2, 2020, now Pat. No. 11,526,142, which is a continuation of application No. 15/221,784, filed on Jul. 28, 2016, now Pat. No. 11,435,713.

(51) Int. Cl.
| | |
|---|---|
| *G05B 19/042* | (2006.01) |
| *G05B 19/418* | (2006.01) |
| *G06F 16/2458* | (2019.01) |
| *G06F 16/25* | (2019.01) |

(52) U.S. Cl.
CPC ....... *G05B 19/0428* (2013.01); *G05B 19/042* (2013.01); *G05B 19/4183* (2013.01); *G06F 16/2477* (2019.01); *G06F 16/254* (2019.01); *G05B 2219/31288* (2013.01); *Y02P 90/02* (2015.11)

(58) Field of Classification Search
CPC .............. G05B 19/0428; G05B 19/042; G05B 2219/31288; G06F 16/2477; G06F 16/254; G06B 19/4183
See application file for complete search history.

(56) References Cited

U.S. PATENT DOCUMENTS

| | | | |
|---|---|---|---|
| 10,732,810 B1* | 8/2020 | Cohen | G06F 16/235 |
| 2010/0211618 A1* | 8/2010 | Anderson | G06F 16/2474 707/812 |
| 2011/0153603 A1* | 6/2011 | Adiba | G06F 16/2477 707/E17.005 |
| 2011/0282836 A1* | 11/2011 | Erickson | G06F 16/273 707/622 |
| 2013/0103658 A1 | 4/2013 | Travis | |

(Continued)

*Primary Examiner* — Etienne P Leroux
*Assistant Examiner* — Farhad Agharahimi
(74) *Attorney, Agent, or Firm* — Dergosits & Noah LLP; Todd A. Noah

(57) ABSTRACT

Operational historian system retrieving summary data values and source data values based on alignment between a summarization cycle duration and a query cycle duration. A retrieval service process executing on a historian device utilizes a summarization cycle duration, including start and/or end times thereof, and a query cycle duration, including start and/or end times thereof, to determine whether to retrieve, via a communications network, source tag data and/or summary tag data from memory storage devices.

20 Claims, 11 Drawing Sheets

(56) References Cited

U.S. PATENT DOCUMENTS

2016/0092484 A1     3/2016   Finkler
2016/0253381 A1     9/2016   Kim et al.
2016/0328432 A1*   11/2016   Raghunathan ...... G06F 16/2264

* cited by examiner

SUMMARIZATION RETRIEVAL IN A PROCESS CONTROL ENVIRONMENT

CROSS-REFERENCE TO RELATED APPLICATIONS

This application is a continuation of U.S. application Ser. No. 16/732,956, filed Jan. 2, 2020, now issued U.S. Pat. No. 11,526,142, entitled "Summarization Retrieval in a Process Control Environment," which is a continuation of U.S. application Ser. No. 15/221,784, filed Jul. 28, 2016, now issued U.S. Pat. No. 11,435,713, entitled "Summarization Retrieval in a Process Control Environment," the disclosure of which is hereby incorporated by reference in its entirety for all purposes.

TECHNICAL FIELD

Aspects of the present disclosure generally relate to the fields of networked computerized industrial control, automation systems, networked computerized systems utilized to monitor, log, and display relevant manufacturing/production events and associated data, and supervisory level control and manufacturing systems. More particularly, aspects relate to systems and methods for retrieving, via a communications network, source tag data and summary tag data from memory storage devices.

BACKGROUND

Industry increasingly depends upon highly automated data acquisition and control systems to ensure that industrial processes are run efficiently, safely, and reliably while lowering their overall production costs. Data acquisition begins when a number of sensors measure aspects of an industrial process and periodically report their measurements back to a data collection and control system. Such measurements come in a wide variety of forms. By way of example, the measurements produced by a sensor/recorder include: temperature, pressure, pH, and mass/volume flow of material, as well as a tallied inventory of packages waiting in a shipping line and/or a photograph of a room in a factory. Storing, retrieving, and analyzing gathered process data is an important part of running an efficient process.

Conventional systems and methods utilize retrieval services that are cyclical and the number of retrieved data values depends on the number of cycles. Data queries using the retrieval services may have large time intervals and/or cycle durations. For example, even if a query result contains only a few hundred rows, the retrieval service has to process millions of source data values. The conventional retrieval services are slow and overburden communications network bandwidth.

SUMMARY

Aspects of the disclosure improve operation of networked computerized industrial control, automation systems, networked computerized systems utilized to monitor, log, and display relevant manufacturing/production events and associated data, as well as supervisory level control and manufacturing systems by reducing extra and unnecessary utilization of processor resources and network bandwidth while satisfying query parameters. Aspects of the disclosure further utilize a summarization cycle duration, including start and/or end times thereof, and a query cycle duration, including start and/or end times thereof, to determine whether to retrieve, via a communications network, source tag data and/or summary tag data from memory storage devices.

In an aspect, an operational historian system includes at least one processor and processor-executable instructions stored on at least one computer-readable storage medium. When executed by the processor, the processor-executable instructions implement a replication component and a retrieval component. The replication component is configured to generate a summary data value from source data values stored in a source database. The source data values are indicative of a physical property of a component within a continuous process. The summary data value comprises a statistical representation of the source data values for a summarization cycle duration. Moreover, the replication component is configured to store the summary tag data value in a summary database. The retrieval component is configured to receive a data query, which has a query cycle duration, from a client computing device via a communications network. The retrieval component is also configured to retrieve the summary data value from the summary database when the summarization cycle duration is less than or equal to the query cycle duration.

In another aspect, a computer-implemented method includes a retrieval service, which is executing on historian of a distributed historization system, receiving a data query for source data values from a remote computing device. The data query has a query cycle duration and the source data values correspond to a physical property of a component in an industrial process. The method further includes the executing retrieval service retrieving summary tags from a metadata server executing on the historian. The summary tags each have a summary cycle duration and correspond to the source data values. The executing retrieval service further retrieves summary data values from a summary database of the distributed historization system when the query cycle duration includes a whole summary cycle duration. Furthermore, the executing retrieval service retrieves source data values from a source database of the distributed historization system when the query cycle duration includes a partial summary cycle duration.

In yet another aspect, a distributed historization system includes a historian processor and a historian memory storage device that stores source data, summary data, and processor-executable instructions for execution by the historian processor to implement a summarization retrieval module. When executed by the historian processor, the processor-executable instructions are configured for receiving a query, by the summarization retrieval module via a communications network, from a client device. The received query has a query cycle duration. The processor-executable instructions are further configured for causing the summarization retrieval module to retrieve the summary data when the query cycle duration includes a whole summary cycle duration of the summary data and when both a start time and an end time of the query aligns with a start time and an end time of a summary cycle of the summary data. Moreover, the processor-executable instructions are configured for causing the summarization retrieval module to retrieve the source data when the query cycle duration includes a partial summary cycle and when the start time of the query is misaligned with the start time of the summary cycles and when the end time of the query is misaligned with the end time of the summary cycles. The processor-executable instructions are also configured for causing the summarization retrieval module to merge the retrieved summary data and the retrieved source data into a query result and transmit the query result from the historian memory storage device to the client device via the communications network.

Other objects and features will be in part apparent and in part pointed out hereinafter.

BRIEF DESCRIPTION OF THE DRAWINGS

FIGS. 1A and 16 are block diagrams illustrating an exemplary system within which aspects of the disclosure may be incorporated.

Corresponding reference characters indicate corresponding parts throughout the drawings.

DETAILED DESCRIPTION

Figure 1A:
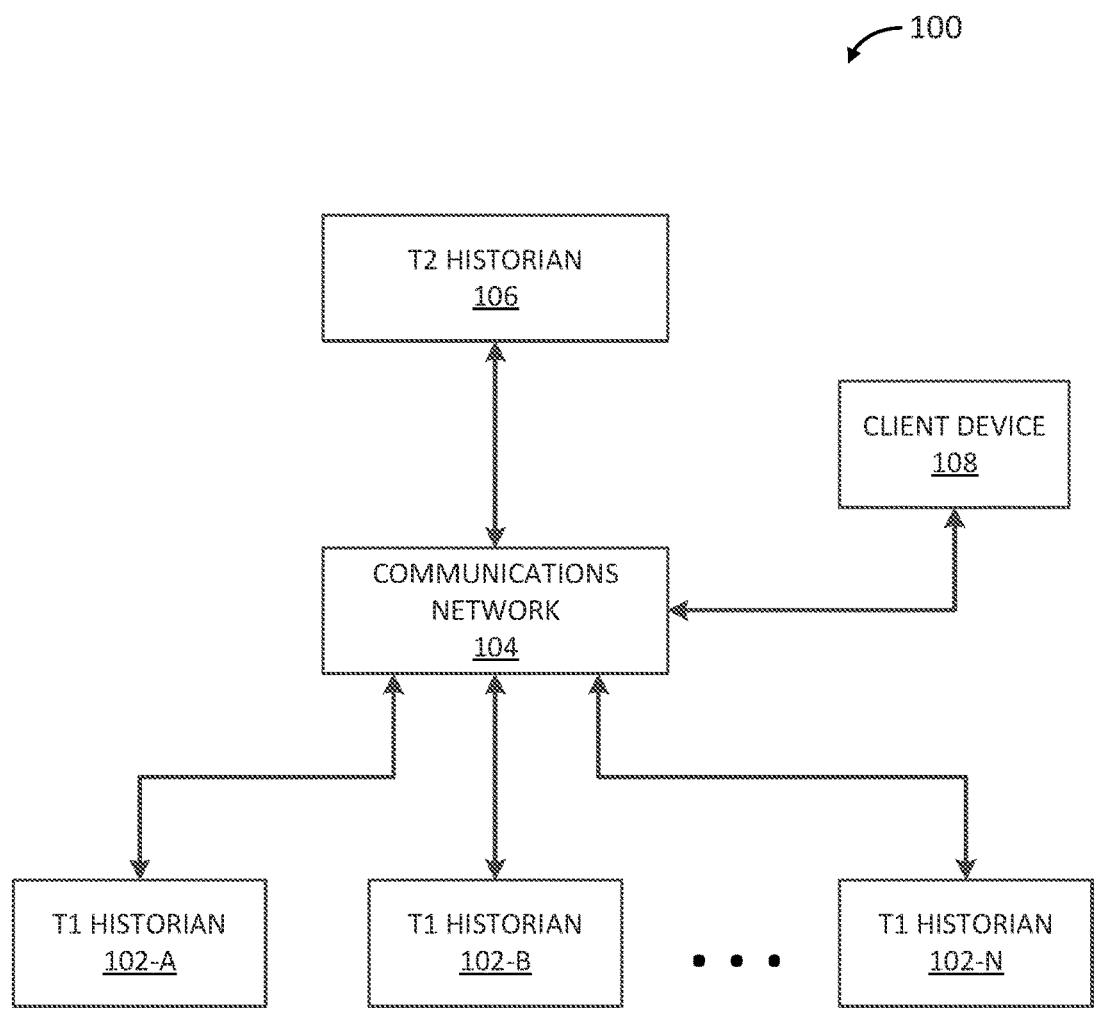

Operational historian systems include replication components/services for replicating data from one historian to one or more other historians. Utilization of these replication services creates a tiered relationship between the historians. For example, data values from a fill sensor may indicate a level of fluid within a tank at 1-second intervals, resulting in 86,400 data values for each 24-hour period. These data values may be stored as a fill sensor tag on a tier one (T1) historian that is geographically near the fill sensor but may need to be accessed by a client device that is geographically remote from the first historian, for instance. The historian system may utilize a tier two (T2) historian that is geographically nearer to the client device to provide data values to the client device. However, transferring all 86,400 data values, which is only for a single sensor in a continuous process that may utilize hundreds of thousands of sensors, from the T1 historian to the T2 historian would burden communications network bandwidth and other resources. To alleviate this burden, the replication components/services of the historian system may instead transfer summary tags (e.g., summary data values), which include statistical information about the data values, from the T1 historian to the T2 historian.

U.S. Pat. No. 8,676,756, entitled Replicating Time-Series Data Values for Retrieved Supervisory Control and Manufacturing Parameter Values in a Multi-Tiered Historian Server Environment, provides additional details regarding tiered historians and is incorporated herein by reference in its entirety.

The summary tags enable T1 historians to provide low resolution (e.g., 30-minute, 1-day, etc.) summary descriptions based upon a stream of high resolution (e.g., 1-second, 1-minute, etc.) data values received by the T1 historian. The T1 historian initially receives data for summary tags as a stream of non-summary data points for a particular tag. In accordance with a specified summary T2 tag, the T1 historian converts the streaming data for a cycle (e.g., time period) into a summary of the data received for the tag during the cycle. For example, the T1 historian analyzes and stores statistical information about the non-summary tag value at specified intervals, such as every 15 minutes. The summary tag is thereafter transmitted by the T1 historian to the T2 historian via a communications network. Exemplary types of summary tags include, but are not limited to, analog summary tags and state summary tags.

Analog summary replication includes a T1 historian providing summary statistics for analog tags to a T2 historian. Analog summary tags include summary statistics derived from analog data acquired during a designated summary cycle. For example, analog summary statistics include the following attributes: First, FirstDateTime, Integral, IntegralOfSquares, Last, LastDateTime, MaxDateTime, Maximum, MinDateTime, Minimum, StartDateTime, TimeGood, and ValueCount. Result attributes for analog summaries calculated based on those attributes include: PercentGood, First, FirstDateTime, Last, LastDateTime, Minimum, MinDateTime, Maximum, MaxDateTime, Average, StdDev, Integral, and ValueCount.

State summary replication includes a T1 historian summarizing discrete state values for a tag during a specified summary cycle. State summary tags facilitate analyzing discrete process variables, such as a machine state (e.g., running, starting, stopping, standby, off, etc.). For example, state summary statistics include the following attributes: MaxContained, MinContained, PartialEnd, PartialStart, StartDateTime, State, StateEntryCount, and TotalContained. Result attributes for state summaries calculated based on those attributes include: StateCount, ContainedStateCount, StateTimeMin, StateTimeMinContained, StateTimeMax, StateTimeMaxContained, StateTimeAvg, StateTimeAvgContained, StateTimeTotal, StateTimeTotalContained, StateTimePercent, and StateTimePercentContained. The contained designation refers to states that begin (e.g., enter) and end (e.g., exit) within a period of interest (e.g., a shift). Thus, a state that begins and/or ends outside a period of interest is not contained within the period of interest.

As an example, co-pending, co-owned U.S. patent application Ser. No. 14/970,062, entitled Historical Summarization in a Process Control Environment, filed Dec. 15, 2015, discloses summarizing history associated with a historized reference or tag and is incorporated herein by reference in its entirety.

The replication services/components of T1 historians also support simple (e.g., full data) replication, which retains full data resolution. In an embodiment, simple replication involves a straightforward copying of the tag data from a T1 historian to a T2 historian. When a tag is configured on a T1 historian for simple replication, all data values stored at the T1 historian for that tag are replicated to a T2 historian. Analog, discrete, and string data tags can be configured for simple replication, in an exemplary embodiment.

Having provided a high-level summary of illustrative aspects of the exemplary T1/T2 historian replication arrangement, attention is directed to the figures and their associated written descriptions. It is noted that the following description is based on illustrative embodiments of the disclosure and should not be taken as limiting the disclosure with regard to alternative embodiments that are not explicitly described herein.

FIGS. 1A and 18 illustrate an exemplary tiered historian system, generally indicated at 100, within which an embodiment of the disclosure may be incorporated. Referring further to FIG. 1A, the tiered historian system includes T1 historians 102, a communications network 104, a T2 historian 106, and a client device 108. Each of the T1 historians 102 receives and stores, on a memory storage device, data values from a continuous process associated therewith and transmits the data values (e.g., by simple replication and/or summary replication) to the T2 historian 106 via the communications network 104 for access by the client device 108. For example, the T1 historians 102 and T2 historian 106 may each be a single server computing device and/or a collection of networked server computing devices (e.g., a cloud). The T1 historians 102 and T2 historian 106 may also comprise a single computing device (e.g., machine) in accordance with one or more embodiments. In an embodiment, client device 108 includes any computing device capable of executing processor-executable instructions and providing a graphical user interface (GUI) including, but not limited to, personal computers, laptops, workstations, tablets, smartphones, mobile devices, and the like.

As an example, co-pending, co-owned U.S. patent application Ser. No. 14/704,661, entitled Distributed Historization System, filed May 5, 2015, discloses a unified approach for historizing to the cloud and is incorporated herein by reference in its entirety.

The communications network 104 is capable of facilitating the exchange of data among various components of system 100, including T1 historians 102 and T2 historian 106. The communications network 104 in the embodiment of FIGS. 1A and 1B includes a wide area network (WAN) that is connectable to other telecommunications networks, including other WANs or portions of the Internet or an intranet, including local area networks (LANs). The communications network 104 may be any telecommunications network that facilitates the exchange of data, such as those that operate according to the IEEE 802.3 (e.g., Ethernet) and/or the IEEE 802.11 (e.g., Wi-Fi) protocols, for example. In another embodiment, communications network 104 is any medium that allows data to be physically transferred through serial or parallel communication channels (e.g., copper wire, optical fiber, computer bus, wireless communication channel, etc.). In an embodiment, communications network 104 comprises at least in part a process control network. In another embodiment, communications network 104 comprises at least in part a SCADA system. In yet another embodiment, communications network 104 comprises at least in part an enterprise manufacturing intelligence (EMI)/operational intelligence (01) system.

Figure 1B:
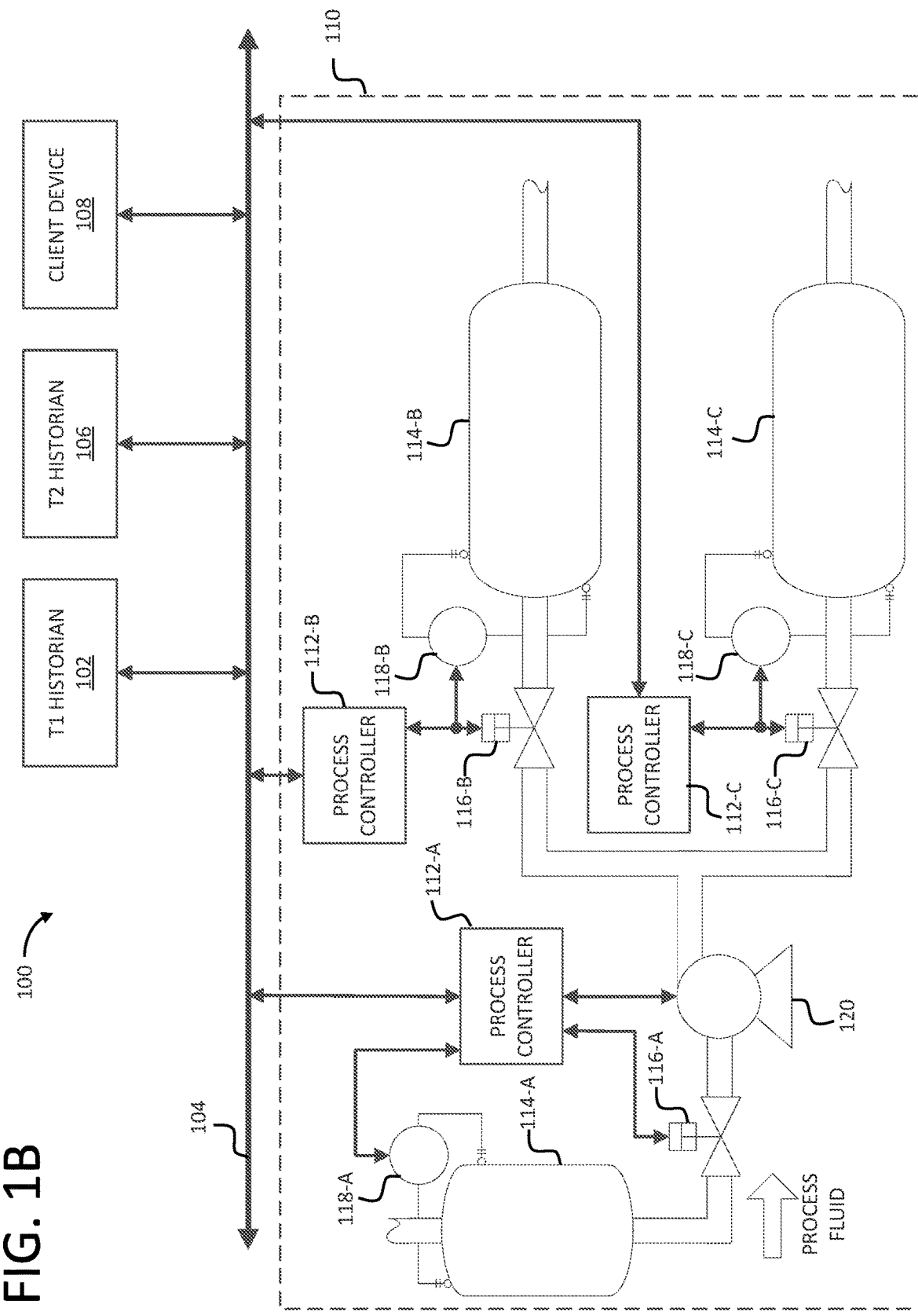

Referring further to FIG. 1B, the system 100 also includes an exemplary plant, such as a fluid processing system 110. As illustrated, the fluid processing system 110 includes process controllers 112, tanks 114, valves 116, sensors 118, and a pump 120. In system 100, T1 historians 102, T2 historians 106, client device 108, process controllers 112, the tanks 114, the valves 116, sensors 118, and the pump 120 are communicatively coupled via communications network 104.

Still referring to FIG. 1B, the fluid processing system 110 is adapted for changing or refining raw materials to create end products. It will be apparent to one skilled in the art that aspects of the present disclosure are capable of optimizing processes and processing systems other than fluid processing system 110 and that system 110 is presented for illustration purposes only. Additional exemplary processes include, but are not limited to, those in the chemical, oil and gas, food and beverage, pharmaceutical, water treatment, and electrical power industries. For example, processes may include conveyers, power distribution systems, and/or processes or operations that cannot be interrupted. In an embodiment, process controllers 112 provide an interface or gateway between components of fluid processing system 110 (e.g., valves 116, sensors 118, pump 120) and other components of system 100 (e.g., T1 historians 102, T2 historian 106, client device 108). In another embodiment, components of fluid processing system 110 communicate directly with T1 historians 102, T2 historian 106, and/or client device 108 via communications network 104. In yet another embodiment, process controllers 112 transmit data to and receive data from T1 historians 102, T2 historian 106, client device 108, valves 612, sensors 614, and/or pump 616 for controlling and/or monitoring various aspects of fluid processing system 110.

The process controllers 112 of FIG. 1B are adapted to control and/or monitor aspects of fluid processing system 110. In an embodiment, processor controllers 112 are programmable logic controllers (PLC) that control and collect data from aspects of fluid processing system 110.

Figure 2:
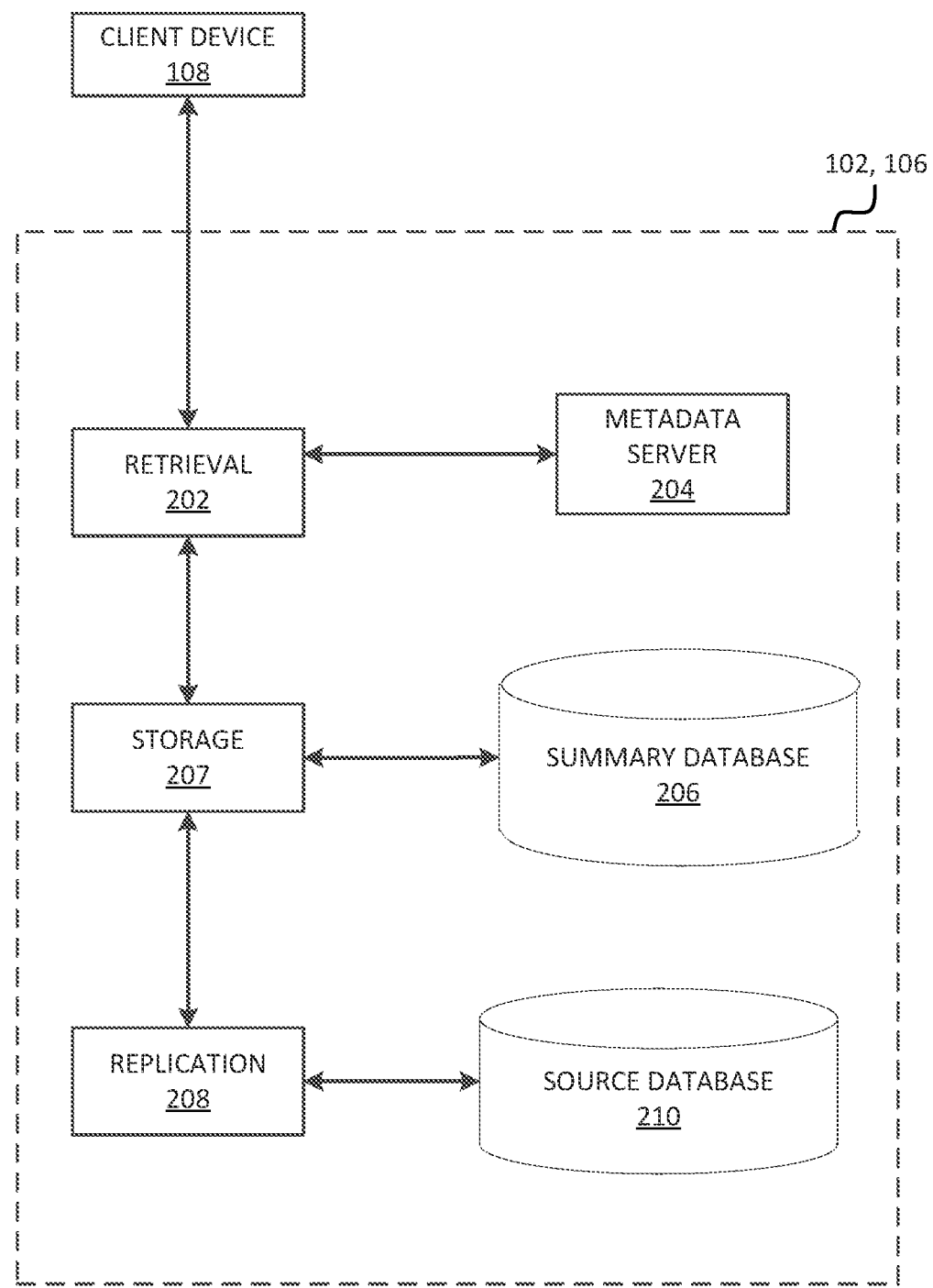
FIG. 2 is a block diagram illustrating an exemplary historian architecture according to an embodiment.

FIG. 2 illustrates an exemplary architecture of an embodiment in which T1 historians 102 and T2 historian 106 comprise a single machine. In the illustrated embodiment, the historian includes a retrieval component 202, a metadata server 204, a summary database 206, a storage component 207, a replication component 208, and a source database 210.

The retrieval component 202 of the exemplary embodiment is adapted to receive queries from client device 108, locate the requested data, perform necessary processing, and return the results to client device 108. In one form, retrieval component 202 creates new tag lists for multiple tag queries that may be a mix of original tags and summarization tags based on the available information. In an embodiment, retrieval component 202 is provided as processor-executable instructions that comprise a procedure, a function, a routine, a method, and/or a subprogram of the historian. Further details regarding retrieval component 202 are provided herein.

The metadata server 204 is adapted to store and provide to retrieval component 202 metadata about which source tags stored in source database 210 correspond to a particular summary tag stored in summary database 206. In an embodiment, metadata server 204 is provided as processor-executable instructions that comprise a procedure, a function, a routine, a method, and/or a subprogram of the historian. Additional details regarding metadata server 204 are provided herein and in U.S. patent application Ser. No. 14/833,906, entitled Storing and Identifying Metadata through Extended Properties in a Historization System, which is incorporated herein by reference in its entirety.

The replication component 208 is adapted to replicate data values from the source database 210. In one embodiment, replication component 208 provides summary replication by analyzing and producing summary statistics for data values stored in source database 210 as further explained herein. In another embodiment, replication component 208 provides data replication on a schedule having a fixed cycle duration. In yet another embodiment, replication component 208 provides data replication on a custom schedule having any duration. For example, the cycle duration may be stored in tag metadata on metadata server 204 (e.g., StorageRate). In one form, replication component 208 is provided as processor-executable instructions that comprise a procedure, a function, a routine, a method, and/or a subprogram of the historian.

Figure 3A:
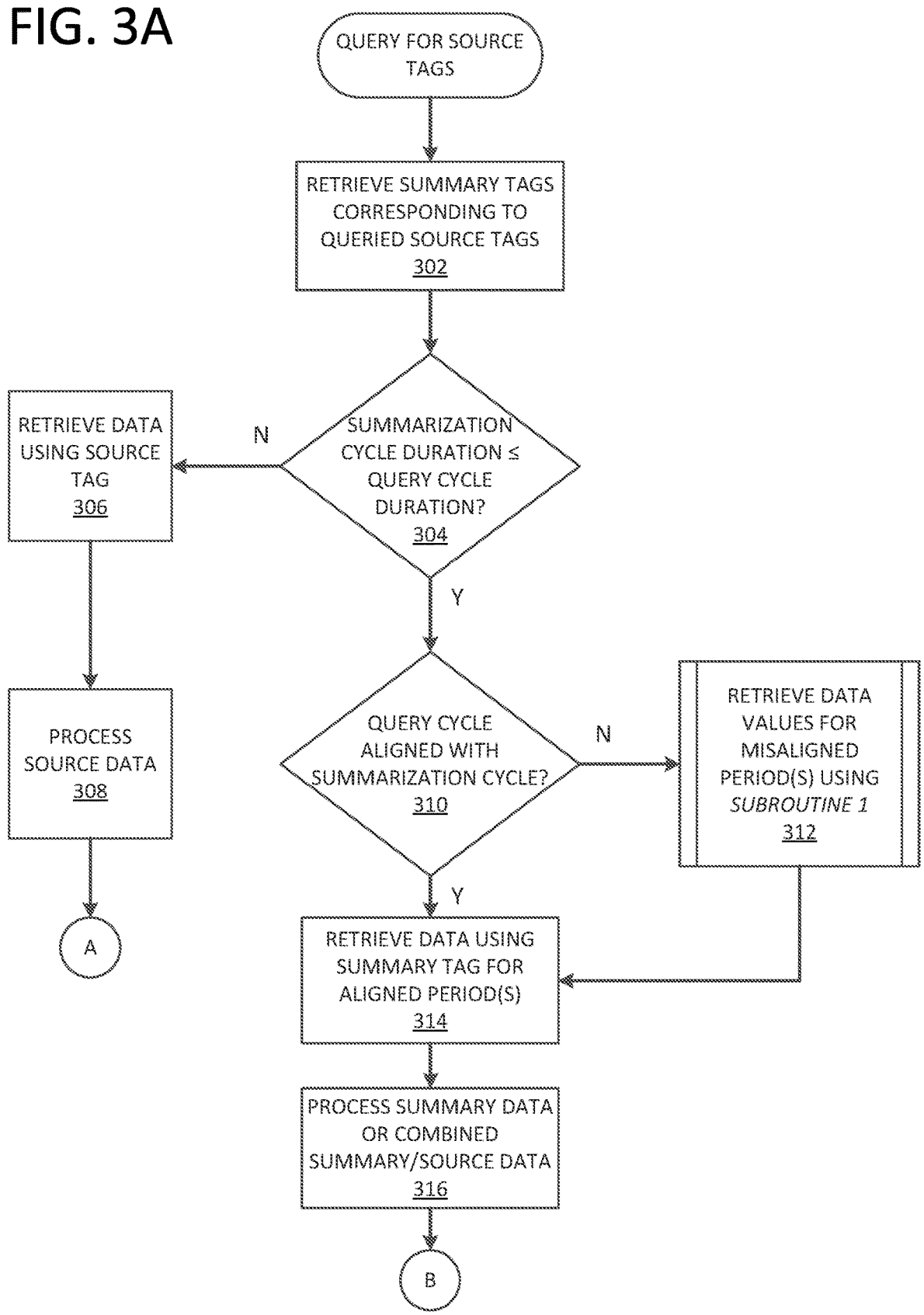
FIGS. 3A to 3D illustrate an exemplary summarization retrieval process according to an embodiment.
Figure 3B:
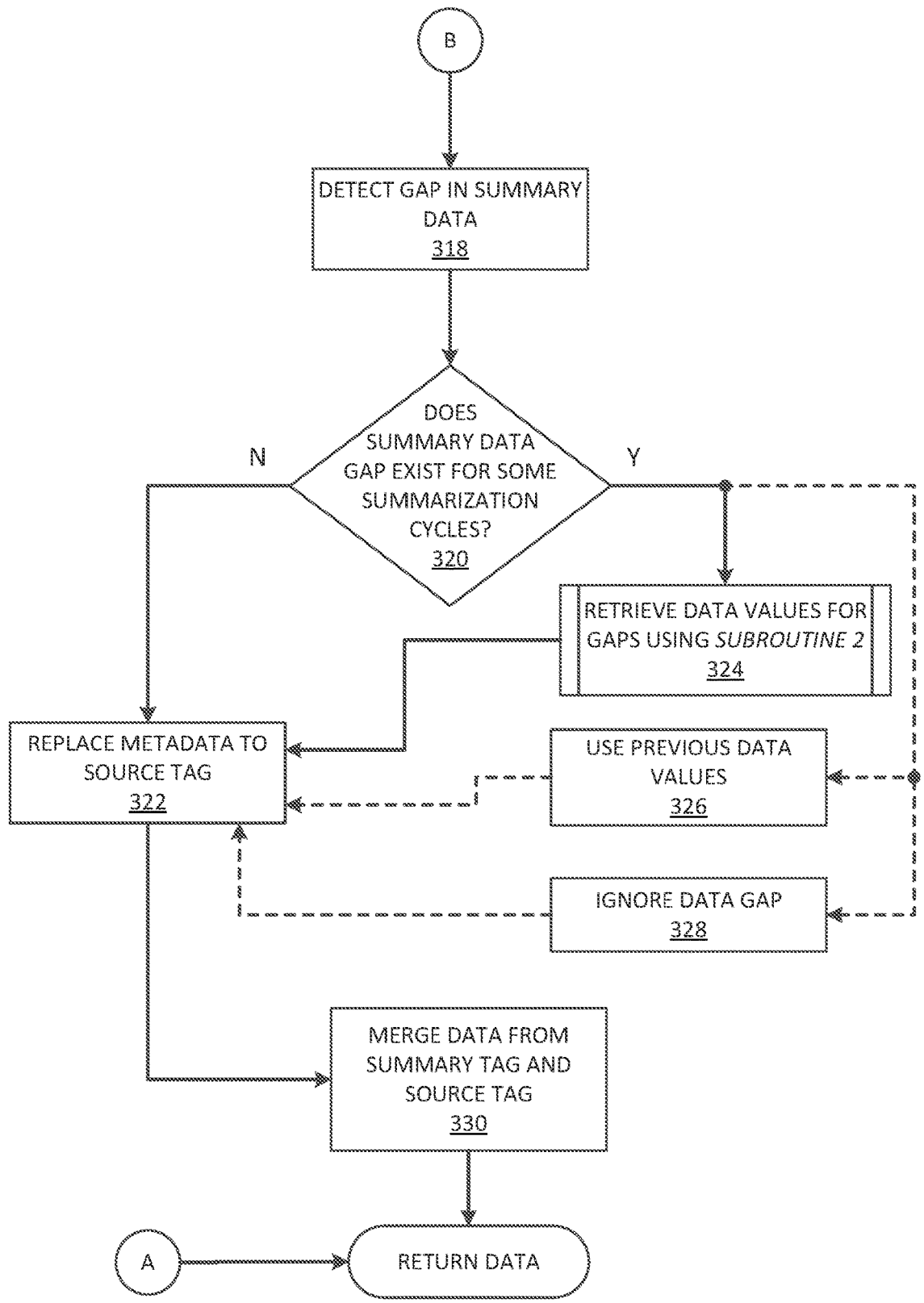

FIGS. 3A and 3B illustrate an exemplary summarization retrieval process in accordance with an aspect of the disclosure. Referring further to FIG. 3A, the process begins when retrieval component 202 receives a query for data from client device 108. The query has a cycle duration defined by a start time and an end time. At step 302, retrieval component 202 retrieves the summary tags corresponding to the queried source tags from metadata server 204. Retrieval component 202 then determines, at step 304, whether any of the retrieved summary tags have a cycle duration less than or equal to the query cycle duration. In an embodiment, retrieval component 202 utilizes a threshold when determining whether any of the retrieved summary tags have a cycle duration equal to the query cycle duration. For example, the retrieval component 202 may consider a summary tag cycle duration that is greater than the query cycle duration to be equal to the query cycle duration as long as the summary tag cycle duration is within a certain threshold (e.g., five percent) of the query cycle duration.

When no summary tags exist that have a cycle duration less than or equal to the query cycle duration, retrieval component 202 retrieves the full source data from source database 210 using the source tags at step 306. In other words, the replication component 208 performs simple replication and the full tag data is directly copied from source database 210 to retrieval component 202. At step 308, retrieval component 202 processes the full source data for the query cycle and returns it to the client device 108, ending the process.

Figure 3C:
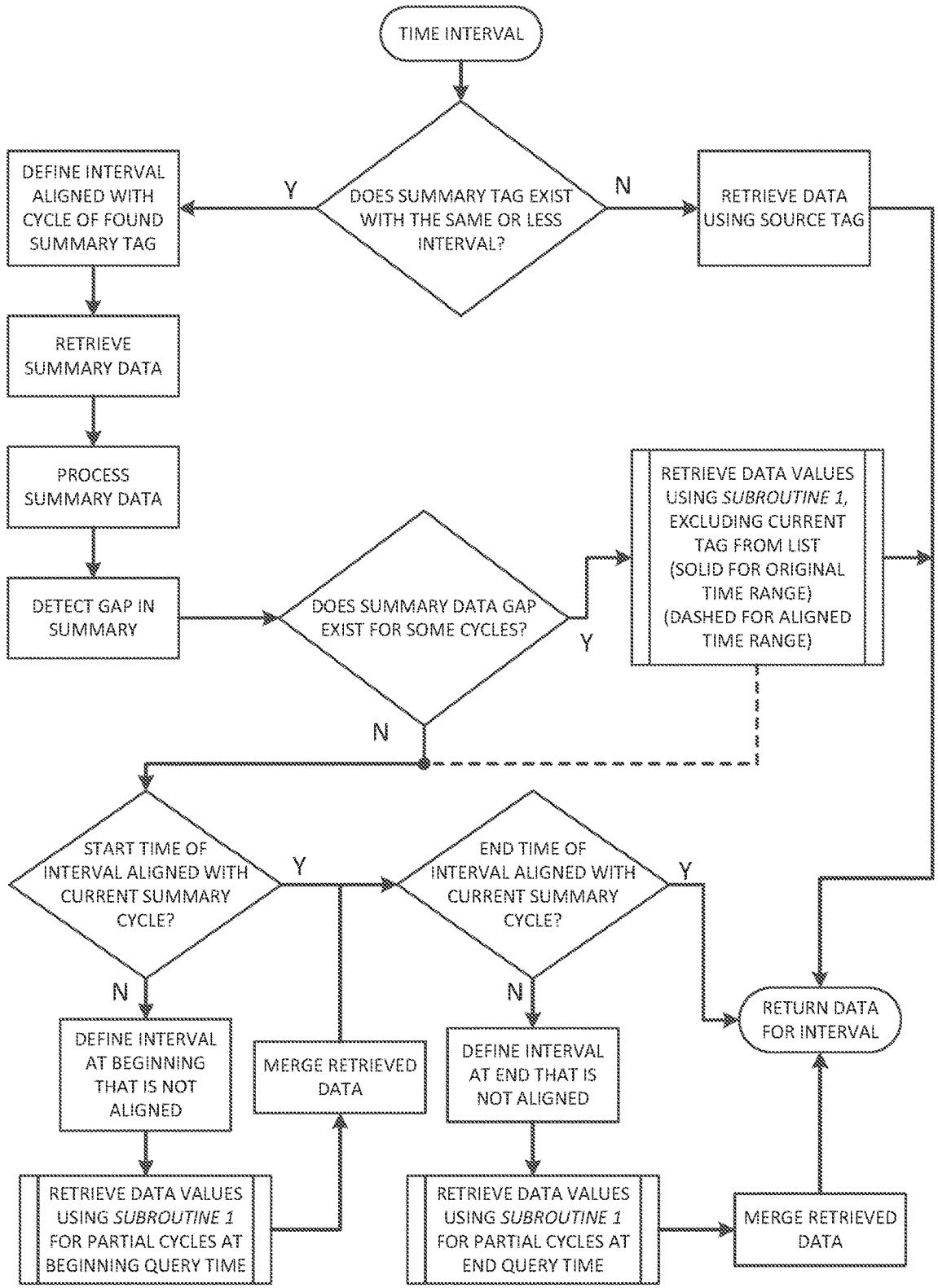

When retrieval component 202 determines at step 304 that at least one of the retrieved summary tags has a cycle duration less than or equal to the query cycle duration, the process continues to step 310. At step 310, retrieval component 202 determines whether a start and/or end time of the query cycle is aligned with a start and/or end time of the summarization cycle. When the query cycle is misaligned with the summarization cycle, retrieval component 202 attempts to retrieve, at step 312, summary data from summary database 206 using the summarization tags with a shorter cycle duration for the misaligned period. In an embodiment, retrieval component 202 utilizes the exemplary Subroutine 1 illustrated in FIG. 3C. For instance, if the summarization cycle is 2:00-2:30, 2:30-3:00, etc. and the query cycle begins at 2:15, retrieval component 202 checks to determine if any summary cycles exist with an interval less than or equal to 15 minutes for the 2:15-2:30 period. If such summary cycles exist, retrieval component 202 will utilize those summary values rather than retrieving the full source data from source database 210. But if no such summary cycles exist, retrieval component 202 retrieves the full source data from source database 210 using the source tags for the misaligned period. As will be understood by one having skill in the art, Subroutine 1 illustrated in FIG. 3C may call itself such that there may be one or more levels of recursion.

Referring further to FIG. 3A, when retrieval component 202 determines the query cycle is aligned with the summarization cycle at step 310 and/or after the retrieval component 202 retrieves data for the misaligned period at step 312, the process continues to step 314. At step 314, retrieval component 202 retrieves summary data from summary database 206 using the summary tags for the aligned period(s). Retrieval component 202 processes the retrieved summary data at step 316. Retrieval component 202 also processes the retrieved source data at step 316 for any misaligned periods.

Referring further to FIG. 3B, retrieval component 202 detects gaps in the summary data at step 318. In an embodiment, replication component 208 guarantees that each summarization cycle has at least one data value. If a particular summarization cycle does not include at least one data value (i.e., has a gap), the value will need to be backfilled. At step 320, retrieval component 202 determines whether a gap exists in summary data for one or more summarization cycles. When retrieval component 202 determines that no summary data gaps exist, retrieval component 202 replaces metadata to source tag at step 322.

Figure 3D:
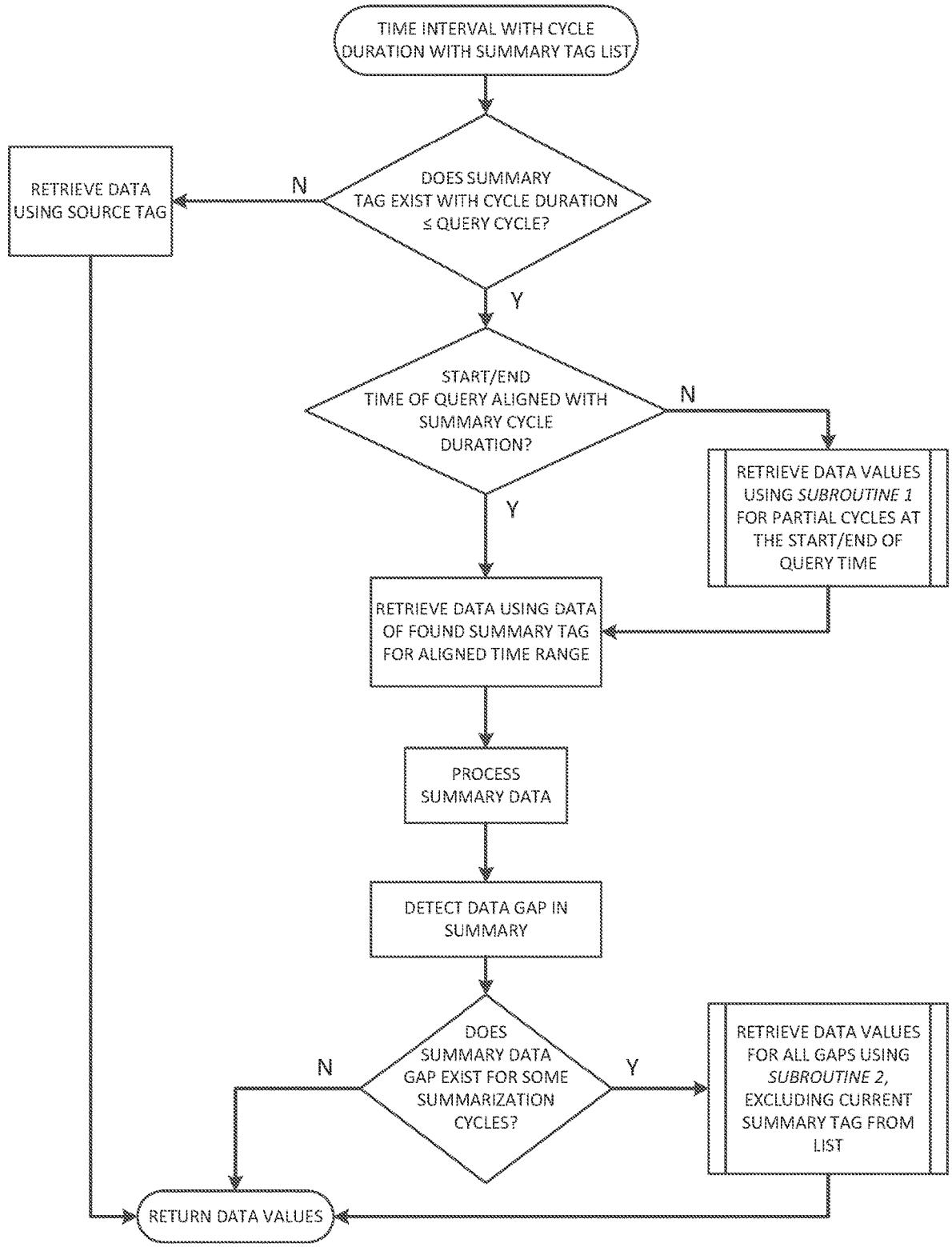

When retrieval component 202 determines, at step 320, that a summary data gap exists for at least one summarization cycle, retrieval component 202 takes at least one of three actions. In an embodiment, retrieval component 202 attempts to retrieve, at step 324, summary data from summary database 206 using the summarization tags with a shorter cycle duration for the data gap period. In accordance with an aspect of the disclosure, retrieval component utilizes the exemplary Subroutine 2 illustrated in FIG. 3D. As illustrated in FIG. 3D, Subroutine 2 may call itself and/or Subroutine 1 such that there may be one or more levels of recursion. If no such summary cycles exist, retrieval component 202 retrieves the full source data from source database 210 using the source tags for the data gap period. After retrieving data at step 324, retrieval component 202 replaces metadata to source tag at step 322. In an additional or alternative embodiment, when retrieval component 202 determines, at step 320, that a summary data gap exists for at least one summarization cycle, retrieval component 202 utilizes, at step 326, a previous data value (e.g., last known summary value, last known source value, etc.) for that summarization cycle. In another additional or alternative embodiment, when retrieval component 202 determines, at step 320, that a summary data gap exists for at least one summarization cycle, retrieval component 202 ignores the data gap, as shown at step 328, and continues to step 322. After replacing metadata to source tag at step 322, retrieval component 202 merges data from summary tags and source tags at step 330 before returning the merged data to the client device 108 to end the process.

In an additional or alternative embodiment, the number of summary data values is larger than the number of source data values for a query cycle having a short duration. For example, the query cycle duration may be 1 minute, 10 seconds and the duration of the summary cycles may be 1 minute. The selected tag may represent values for an infrequent action and thus may not have any data values for a 1-month period. In such a situation, summarization retrieval may need to process more data values using the summary data values than if the source data values are used. In this embodiment, retrieval component 202 may analyze, using a ValueCount field for example, the number of summary data values in the summarization cycle and determine whether to use the summary data values in summary database 206 or the source data values in source database 210.

The following example is provided to help explain the process illustrated in FIGS. 3A and 3B and in no way limits the scope of the disclosure. As an example, a query may include client device 108 requesting a fill level of a fluid stored in tank 114-A during a query cycle of 30-minute intervals from 7:45 AM to 5:15 PM on a particular day. The source database 210 stores source tags for data values representing the fill level of tank 114-A for every 1-second interval during the particular day. The summary database 206 stores summary tags for the source tags stored in source database 210. For example, replication component 208 may have summarized the source data using a "best fit" approach on 30-minute intervals. In other words, the summary database 206 stores summary tags for data values representing the "best fit" of the source data for 30-minute intervals from 12:00:00 AM to 11:59:59 PM for the particular day.

Upon receiving the query from client device 108, retrieval component 202 retrieves (step 302) the summary tags from metadata server 204 and compares (step 304) the summarization cycle duration to the query cycle duration. In the example, the summarization cycle duration is 30 minutes and the query cycle duration is also 30 minutes. Because the summarization cycle duration is equal to the query cycle duration, retrieval component 202 determines (step 310) whether the query cycle is aligned with the summarization cycles. Here, the query cycle begins at 7:45 AM, but the summarization cycle is on a schedule of 7:00-7:30, 7:30-8:00, 8.00-8:30, etc. so the beginning of the query cycle is misaligned with the summarization cycles. Moreover, the query cycle ends at 5:15 PM so it is misaligned with the summarization cycles that run from 4:30-5:00, 5:00-5:30, 5:30-6:00, etc. In an embodiment, the 7:45 AM to 8:00 AM and 5:00 PM to 5:15 PM periods may be referred to as partial cycles.

Due to these misalignments, retrieval component 202 retrieves (step 312) the source data from source database 210 using the source tags for the partial cycles, namely, misaligned periods of 7:45 AM to 8:00 AM and 5:00 PM to 5:15 PM. The retrieval component 202 then retrieves (step 314) the summary data from summary database 206 for the aligned periods (e.g., 8:00-8:30, 8:30-9:00 . . . 4:00-4:30, 4:30-5:00), which may be referred to as full or whole cycles in one or more embodiments.

When retrieval component 202 determines (step 320) that no data gaps exist for any of the summarization cycles between 8:00 AM and 5:00 PM, it replaces (step 322) the metadata to source tag, merges (step 330) the summary data and source data, and returns the merged data to client device 108. But, for example, sensor 118-A may have become disconnected or experienced an outage at 1:10 PM. Thus, there will be a gap in the summary data for the 1:00 PM to 1:30 PM summarization cycle. When retrieval component 202 detects this data gap (steps 318 and 320), it will retrieve the source data from source database 210 using the source tags for the gap period of 1:00 PM to 1:30 PM. Additionally or alternatively, retrieval component 202 may assign an uncertainty value to the summarization cycle from 1:00 PM to 1:30 PM or ignore the data gap, as further described herein. The retrieval component 202 then replaces (step 322) the metadata to source tag, merges (step 330) the summary data and source data, and returns the merged data to client device 108.

Summarization cycles may be different than query cycles. For example, the duration of summarization cycles may be different than the duration of query cycles or the start and/or end times of the summarization cycles may be different from the start and/or end times of the query cycles. In an embodiment, aspects of system 100 may constrain client device 108 to query cycle durations and start and/or end times that match the summarization cycle durations and start and/or end times. Further to this example, summarization cycles may have 24-hour periods and client device 108 is constrained to query cycles of multiples of 24 hours (e.g., 24 hours, 48 hours, etc.) to match the summarization cycles. When a query cycle is aligned with summarization cycles retrieval component 202 will retrieve and process summary data from summary database 206, and when the query cycle is misaligned with the summarization cycles retrieval component 202 will retrieve and process the full source data from source database 210.

Figure 4:
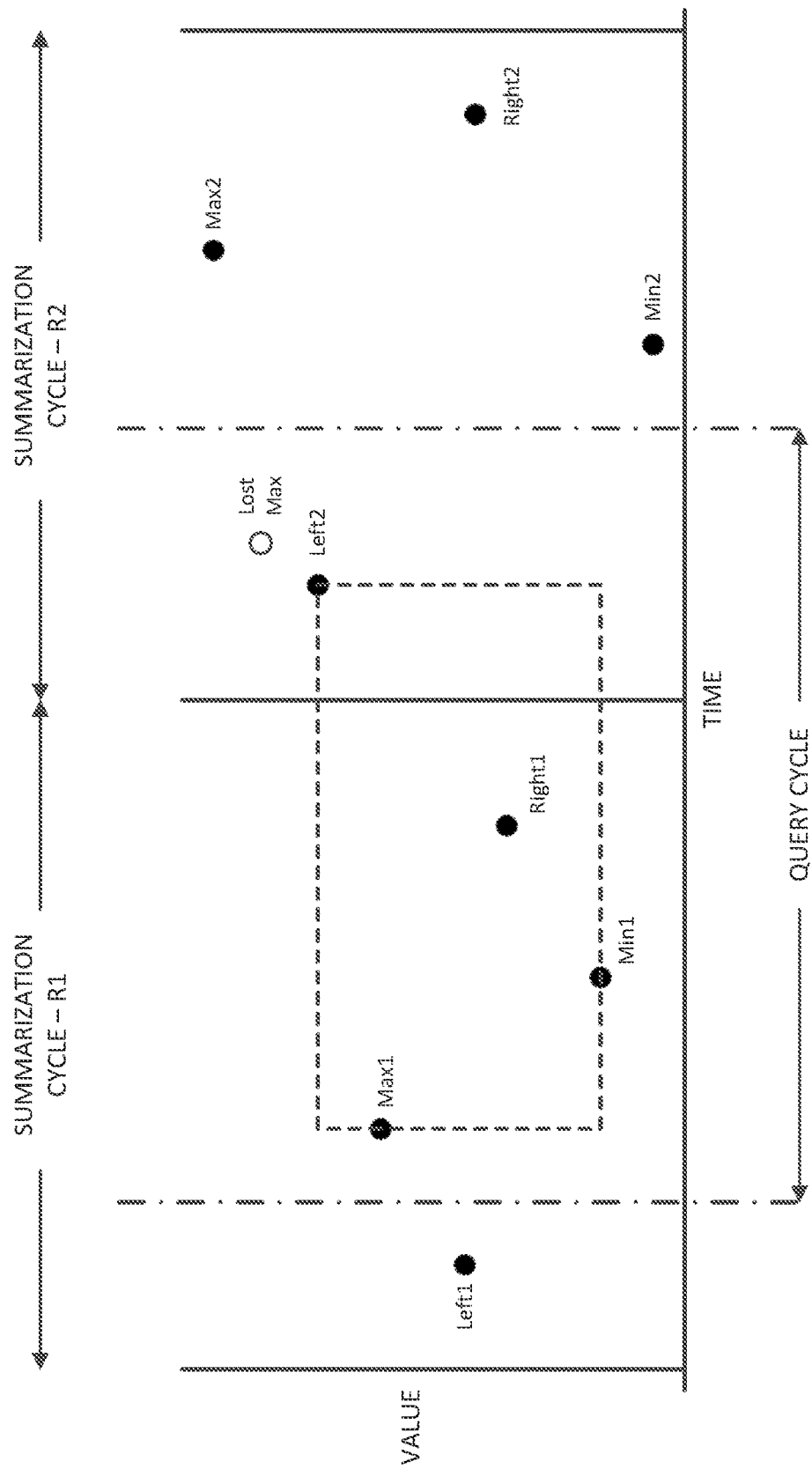
FIGS. 4 and 5 are diagrams illustrating exemplary selections of data values by the exemplary summarization retrieval process of FIGS. 3A to 3D.

In another embodiment, aspects of system 100 provide an approximation when query cycles and summarization cycles are misaligned. Referring to FIG. 4, the duration of a query cycle may be greater than the duration of a summarization cycle for a "best fit" retrieval mode. Under a best fit retrieval mode, the total time for the query is divided into even cycles (e.g., sub-periods) and then at least four values are returned for each cycle: first value in the cycle ("left"), last value in the cycle ("right"), minimum value in the cycle, and maximum value in the cycle. As illustrated in FIG. 4, a best fit summarization by replication component X resulted in four values (Left1, Right1, Min1, Max1) for the R1 summarization cycle and four values (Left2, Right2, Min2, Max2) for the R2 summarization cycle. The query cycle is misaligned with the summarization cycles and thus retrieval component 202 will select the best fit points from those points that are within the query cycle. As illustrated by the square formed by dashed lines, retrieval component 202 selects Max1 as the first value in the query cycle, Left2 as the last value in the query cycle, Min1 as the minimum value in the query cycle, and Left2 as the maximum value in the query cycle. Left2 is selected as the maximum value because the value of Left2 is greater than the maximum value of the R1 summarization cycle (i.e., Max1) and the maximum value of the R2 summarization cycle (i.e., Max2) is outside of the query cycle.

Also as illustrated, this embodiment may sacrifice some accuracy by using the summarization data because a full data value (shown as LostMax) may exist within the duration of the query cycle and be the true maximum value within the query cycle. However, because the LostMax value was not within the R1 summarization period and was not the maximum value within the R2 summarization period, it was not included in the summary data available to retrieval component 202.

Figure 5:
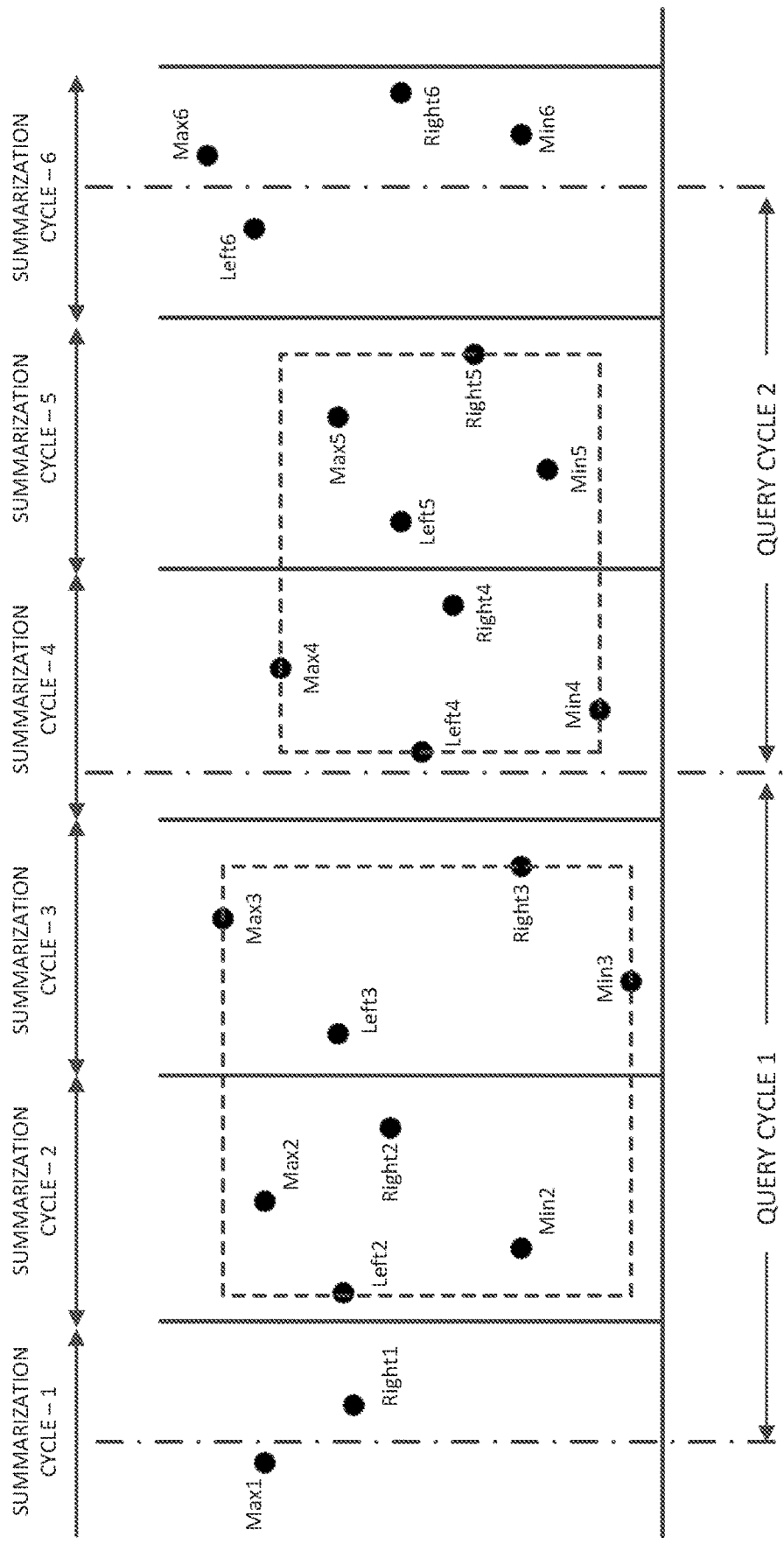

In yet another embodiment, retrieval component 202 selects appropriate query cycles that will be aligned with summarization cycles. For example, retrieval component 202 may alter the time parameters of the query cycle to return a result that is aligned with summarization cycles. As illustrated in FIG. 5, the query cycle may be large enough to encompass two full summarization cycles, but the start and/or end times of each may not align. For Query Cycle 1, retrieval component 202 uses Summarization Cycle 2 and Summarization Cycle 3 and ignores the partial portions of Summarization Cycle 1 and Summarization Cycle 4. In this manner, Query Cycle 1 becomes aligned with the summarization cycles. For Query Cycle 2, retrieval component 202 uses Summarization Cycle 4 and Summarization Cycle 5 and ignores the partial portion of Summarization Cycle 6. In one form, retrieval component 202 utilizes the approach illustrated by FIG. 4 and the approach illustrated by FIG. 5, compares the accuracy of results for each, and uses the one having greater accuracy.

The retrieval component 202 supports best fit retrieval modes, integral retrieval modes, time-weighted average retrieval modes, minimum retrieval modes, maximum retrieval modes, and like retrieval modes having cycle duration as a parameter. The retrieval component 202 supports retrieval modes that are delta in nature (e.g., best fit, minimum, maximum) and pure cyclic in nature (e.g., integral, time-weighted average). Best fit, minimum, and maximum retrieval modes do not require retrieval component to perform any calculations.

In one form, retrieval component 202 uses an integral retrieval mode for query cycles misaligned with summary cycles in accordance with the approach illustrated by FIG. 4. The retrieval component 202 integrates the summarization cycles within the query cycle using the following formula:

$$R_i = \sum_{k=m}^{n} I_k * \frac{t'_k}{t_k}$$

where m is the index of the first summarization cycle intersecting the query cycle, n is the index of the last summarization cycle intersecting the query cycle, i is the index of the query cycle, $R_i$ is the integral of the i-th query cycle, $I_k$ is the integral of the k-th summarization cycle that intersects the i-th query cycle, $t'_k$ is the time of intersection between the k-th summarization cycle and the i-th query cycle, $t_k$ is the total time of intersection between the k-th summarization cycle and the i-th query cycle, and $T_i$ is the total time of the i-th query cycle.

Figure 6:
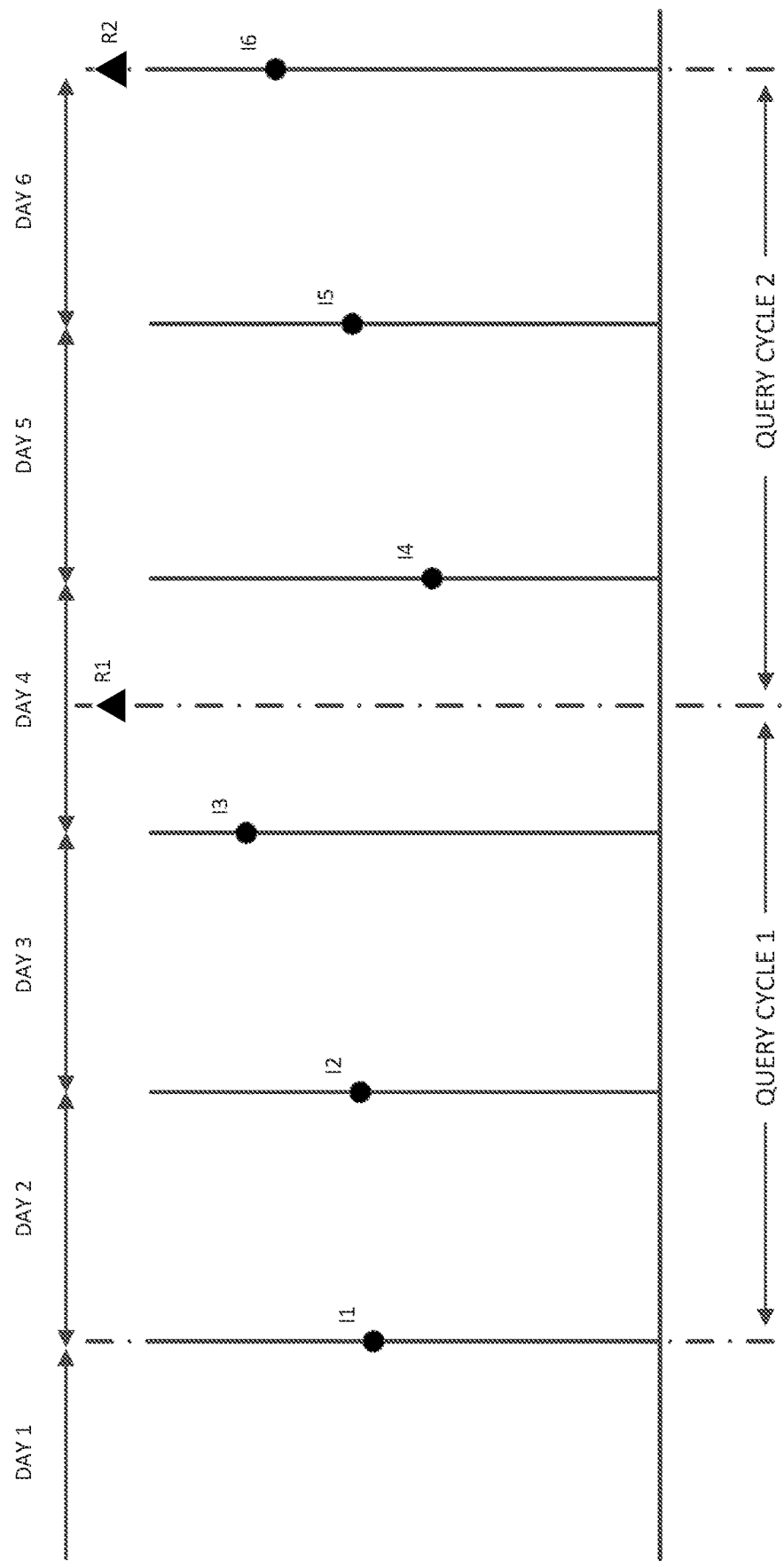
FIGS. 6 and 7 are diagrams illustrating exemplary selections of data values by the exemplary summarization retrieval process of FIGS. 3A to 3D using an integral retrieval mode.

In the example illustrated in FIG. 6 with 1-day summarization cycles and 2.5-day query cycles, the integral for the first query cycle is R1=I2+I3+(I4*0.5) because the fourth day summarization cycle is intersected by the query cycle at mid-day. In this example, retrieval component 202 assumes that distribution of the I4 point was constant during the entire fourth day summarization cycle.

In another form, retrieval component 202 uses an integral retrieval mode for query cycles misaligned with summary cycles in accordance with the approach illustrated by FIG. 5 (e.g., cycle duration of result will be different than the query cycle duration received from client device 108). The retrieval component 202 integrates summarization cycles that are completely within a particular query cycle (e.g., whole cycles) using the following formula:

$$R_i = \sum_{k=m}^{n} I_k$$

where m is the index of the first summarization cycle inside the query cycle, n is the index of the last summarization cycle inside the query cycle, i is the index of the query cycle, $R_i$ is the integral of the i-th query cycle, $I_k$ is the integral of the k-th summarization cycle that intersects the i-th query cycle, $t_k$ is the time of intersection between the k-th summarization cycle and the i-th query cycle, $T_i$ is the total time of the i-th query cycle, and the integral divisor is taken from the source tag.

Figure 7:
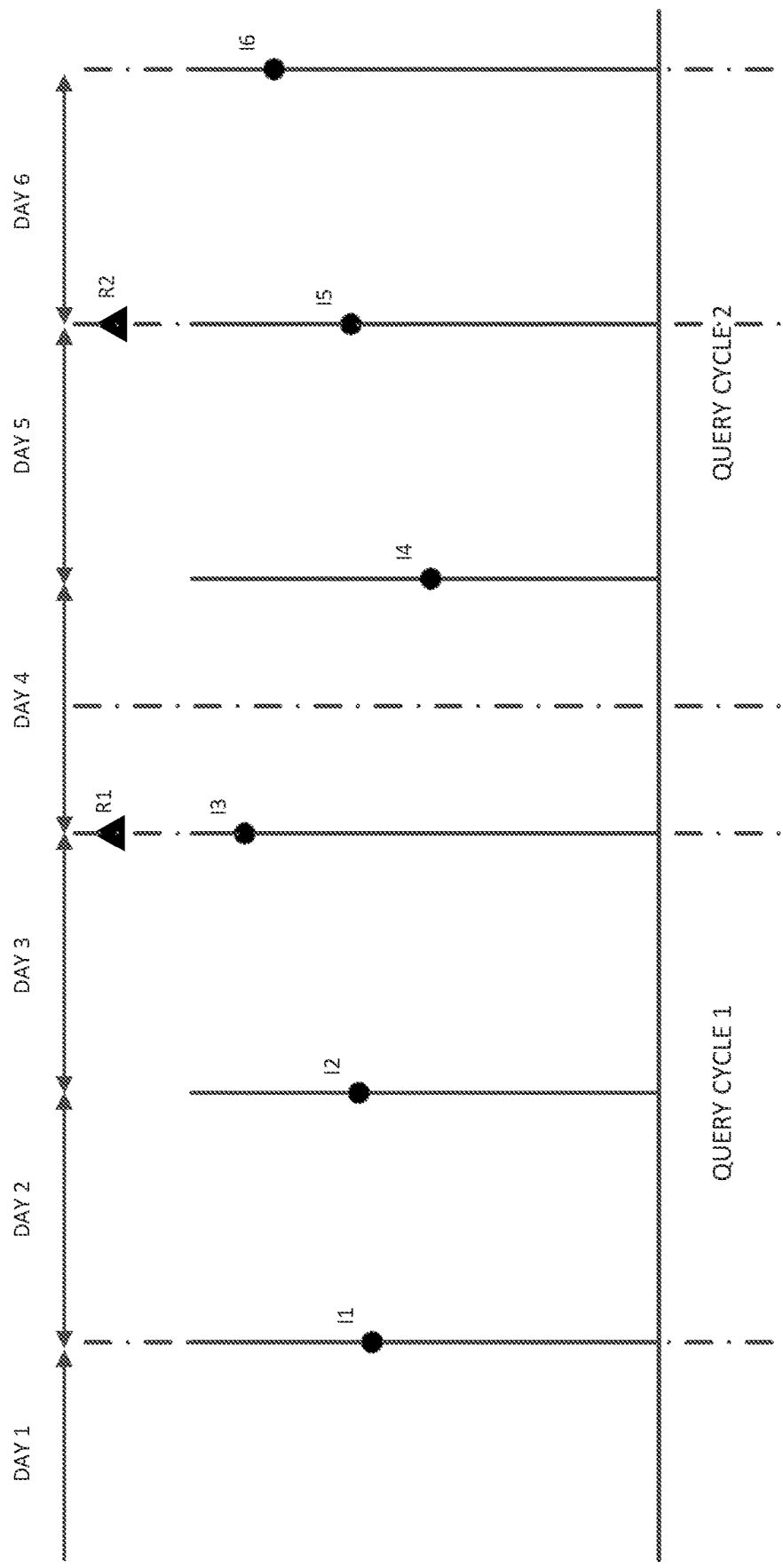

In the example illustrated in FIG. 7, with 1-day summarization cycles and 2.5-day query cycles, the integral for the first query cycle is R1=I2+I3 because only the two days (e.g., summarization cycles) that fit entirely within the query cycle are used.

The retrieval component 202 can also calculate, based on integral value, a time-weighted average based on stair-step interpolation by the formula:

$$TWA = \frac{I}{T}$$

where I is the integral value of the cycle (e.g., calculated by one of the above methods) and T is the cycle time.

Embodiments of the present disclosure may comprise a special purpose computer including a variety of computer hardware, as described in greater detail below.

Embodiments within the scope of the present disclosure also include computer-readable media for carrying or having computer-executable instructions or data structures stored thereon. Such computer-readable media can be any available media that can be accessed by a special purpose computer. By way of example, and not limitation, computer-readable storage media include both volatile and nonvolatile, removable and non-removable media implemented in any method or technology for storage of information such as computer readable instructions, data structures, program modules or other data. Computer storage media are non-transitory and include, but are not limited to, random access memory (RAM), read only memory (ROM), electrically erasable programmable ROM (EEPROM), compact disk ROM (CD-ROM), digital versatile disks (DVD), or other optical disk storage, solid state drives (SSDs), magnetic cassettes, magnetic tape, magnetic disk storage, or other magnetic storage devices, or any other medium that can be used to carry or store desired program code means in the form of computer-executable instructions or data structures and that can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

The following discussion is intended to provide a brief, general description of a suitable computing environment in which aspects of the disclosure may be implemented. Although not required, aspects of the disclosure will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

Those skilled in the art will appreciate that aspects of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Aspects of the disclosure may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing aspects of the disclosure includes a special purpose computing device in the form of a conventional computer, including a processing unit, a system memory, and a system bus that couples various system components including the system memory to the processing unit. The system bus may be any of several types of bus structures including a memory bus or memory controller, a peripheral bus, and a local bus using any of a variety of bus architectures. The system memory includes nonvolatile and volatile memory types. A basic input/output system (BIOS), containing the basic routines that help transfer information between elements within the computer, such as during start-up, may be stored in ROM. Further, the computer may include any device (e.g., computer, laptop, tablet, PDA, cell phone, mobile phone, a smart television, and the like) that is capable of receiving or transmitting an IP address wirelessly to or from the internet.

The computer may also include a magnetic hard disk drive for reading from and writing to a magnetic hard disk, a magnetic disk drive for reading from or writing to a removable magnetic disk, and an optical disk drive for reading from or writing to removable optical disk such as a CD-ROM or other optical media. The magnetic hard disk drive, magnetic disk drive, and optical disk drive are connected to the system bus by a hard disk drive interface, a magnetic disk drive-interface, and an optical drive interface, respectively. The drives and their associated computer-readable media provide nonvolatile storage of computer-executable instructions, data structures, program modules, and other data for the computer. Although the exemplary environment described herein employs a magnetic hard disk, a removable magnetic disk, and a removable optical disk, other types of computer readable media for storing data can be used, including magnetic cassettes, flash memory cards, digital video disks, Bernoulli cartridges, RAMs, ROMs, SSDs, and the like.

Communication media typically embody computer readable instructions, data structures, program modules or other data in a modulated data signal such as a carrier wave or other transport mechanism and includes any information delivery media.

One or more aspects of the disclosure may be embodied in computer-executable instructions (i.e., software), routines, or functions stored in system memory or nonvolatile memory as application programs, program modules, and/or program data. The software may alternatively be stored remotely, such as on a remote computer with remote application programs. Generally, program modules include routines, programs, objects, components, data structures, etc. that perform particular tasks or implement particular abstract data types when executed by a processor in a computer or other device. The computer executable instructions may be stored on one or more tangible, non-transitory computer readable media (e.g., hard disk, optical disk, removable storage media, solid state memory, RAM, etc.) and executed by one or more processors or other devices. As will be appreciated by one of skill in the art, the functionality of the program modules may be combined or distributed as desired in various embodiments. In addition, the functionality may be embodied in whole or in part in firmware or hardware equivalents such as integrated circuits, application specific integrated circuits, field programmable gate arrays (FPGA), and the like.

The computer may operate in a networked environment using logical connections to one or more remote computers. The remote computers may each be another personal computer, a tablet, a PDA, a server, a router, a network PC, a peer device, or other common network node, and typically include many or all of the elements described above relative to the computer. The logical connections include a local area network (LAN) and a wide area network (WAN) that are presented here by way of example and not limitation. Such networking environments are commonplace in office-wide or enterprise-wide computer networks, intranets and the Internet.

When used in a LAN networking environment, the computer is connected to the local network through a network interface or adapter. When used in a WAN networking environment, the computer may include a modem, a wireless link, or other means for establishing communications over the wide area network, such as the Internet. The modem, which may be internal or external, is connected to the system bus via the serial port interface. In a networked environment, program modules depicted relative to the computer, or portions thereof, may be stored in the remote memory storage device. It will be appreciated that the network connections shown are exemplary and other means of establishing communications over wide area network may be used.

Preferably, computer-executable instructions are stored in a memory, such as the hard disk drive, and executed by the computer. Advantageously, the computer processor has the capability to perform all operations (e.g., execute computer-executable instructions) in real-time.

The order of execution or performance of the operations in embodiments illustrated and described herein is not essential, unless otherwise specified. That is, the operations may be performed in any order, unless otherwise specified, and embodiments may include additional or fewer operations than those disclosed herein. For example, it is contemplated that executing or performing a particular operation before, contemporaneously with, or after another operation is within the scope of aspects of the disclosure.

Embodiments may be implemented with computer-executable instructions. The computer-executable instructions may be organized into one or more computer-executable components or modules. Aspects of the disclosure may be implemented with any number and organization of such components or modules. For example, aspects of the disclosure are not limited to the specific computer-executable instructions or the specific components or modules illustrated in the figures and described herein. Other embodiments may include different computer-executable instructions or components having more or less functionality than illustrated and described herein.

When introducing elements of aspects of the disclosure or the embodiments thereof, the articles "a", "an", "the" and "said" are intended to mean that there are one or more of the elements. The terms "comprising", "including", and "having" are intended to be inclusive and mean that there may be additional elements other than the listed elements.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for improving bandwidth usage of a communications network comprising:
one or more historians comprising one or more computers, the one or more computers comprising one or more processors and one or more non-transitory computer readable media, the one or more non-transitory computer readable media comprising program instructions stored thereon that when executed cause the one or more computers to:
receive, by the one or more processors, a query for source tags from a query source;
retrieve, by the one or more processors, summary tags corresponding to the queried source tags;

determine, by the one or more processors, if a summarization cycle is less than a query cycle;
determine, by the one or more processors, if the query cycle aligns with the summarization cycle when the summarization cycle is less than the query cycle;
retrieve, by the one or more processors, summary data using the summary tags for aligned periods when the query cycle aligns with the summarization cycle; and
determine, by the one or more processors, if there is a gap in the summary data.

2. The system of claim 1,
wherein if the summarization cycle is less than the query cycle, then:
retrieve, by the one or more processors, the source data using the source tags; and
return by the one or more processors, the source data to the query source.

3. The system of claim 1,
wherein if the summarization cycle is greater than the query cycle, then:
determine, by the one or more processors, if the query cycle aligns with the summarization cycle;
if the query cycle does not align with the summarization cycle, then:
retrieve, by the one or more processors, the source data for misaligned periods;
retrieve, by the one or more processors, the summary data using the summary tags for aligned period; and
return, by the one or more processors, a combination of the summary data and the source data.

4. The system of claim 1,
wherein if the summarization cycle is greater than the query cycle, then:
determine, by the one or more processors, if the query cycle aligns with the summarization cycle;
if the query cycle does align with the summarization cycle, then:
retrieve, by the one or more processors, data using summary tag for aligned period;
return, by the one or more processors, a combination of the summary data and the source data.

5. The system of claim 3,
wherein the program instructions further cause the one or more computers to:
if there is the gap in the summary data, then:
retrieve, by the one or more processors, data values for the gap, or
use, by the one or more processors, previous data values, or
ignore the gap.

6. The system of claim 5,
wherein if the gap exist in the summary data, then further instructions include to:
merge, by the one or more processors, summary tag data and source tag data; and
return, by the one or more processors, the merged summary tag data and source tag data.

7. The system of claim 3,
wherein if there is no the gap in the summary data, then the program instructions further cause the one or more computers to:
merge, by the one or more processors, summary tag data and source tag data; and
return, by the one or more processors, the merged summary tag data and source tag data.

8. The system of claim 3,
wherein retrieving data values for the misaligned periods includes program instructions that further cause the one or more computers to:
determine, by the one or more processors, if a summary tag exists with a same or less interval;
if a summary tag does not exist with a same or less interval, then:
retrieve, by the one or more processors, the source data using the source tags; and
return, by the one or more processors, the source data.

9. The system of claim 3,
wherein retrieving data values for the misaligned periods includes program instructions that further cause the one or more computers to:
determine, by the one or more processors, if a summary tag exists with a same interval or a less interval;
if a summary tag does exist with a same interval or a less interval, then:
retrieve, by the one or more processors, the summary data; and
determine, by the one or more processors, if there is a gap in the summary data.

10. The system of claim 9,
wherein if a summary tag does exist with a same interval or a less interval, then further instructions include to determine, by the one or more processors, if the summary data gap exists for some cycles;
if the summary data gap does exist for some cycles, then:
retrieve, by the one or more processors, the source data values; and
return, by the one or more processors, the source data values for the same interval or the less interval.

11. The system of claim 9,
wherein if a summary tag does exist with a same interval or less interval, then further instructions include to determine, by the one or more processors, if a summary data gap exists for some cycles;
if the summary data gap does not exist for some cycles, then further instructions include to determine, by the one or more processors, if a start time of the same interval or the less interval aligns with the summarization cycle.

12. The system of claim 11,
wherein if a start time of the same interval or the less interval aligns with the summarization cycle, then further instructions include to:
determine, by the one or more processors, if an end time of the same interval or the less interval aligns with the summarization cycle.

13. The system of claim 12,
wherein if the end time of the same interval or the less interval aligns with the summarization cycle, then then further instructions include to return the summary data for the summarization cycle.

14. The system of claim 11,
wherein if a start time of the same interval or the less interval does not align with a current summary cycle, then further instructions include to:
define, by the one or more processors, the same interval or the less interval at a beginning that is not aligned;
retrieve, by the one or more processors, data values for partial cycles at the beginning of a time of the query; and
merge, by the one or more processors, the data values for partial cycles.

15. The system of claim 11,
wherein if the start time of the same interval or the less interval aligns with a current summary cycle, then further instructions include to:
determine, by the one or more processors, if an end time of the same interval or the less interval aligns with the current summary cycle;
if the end time of the same interval or the less interval aligns with the current summary cycle, then:
define, by the one or more processors, the same interval or the less interval at an end that is not aligned;
retrieve, by the one or more processors, data values for partial cycles at the end that is not aligned;
merge, by the one or more processors, the retrieved data values for partial cycles;
return, by the one or more processors, the retrieved data values for partial cycles for the same interval or the less interval.

16. The system of claim 5,
wherein retrieving data values for the gap includes determining, by the one or more processors, if a summary tag exists with a cycle duration less than the query cycle;
if a summary tag does exist with a cycle duration less than the query cycle, then:
retrieve, by the one or more processors, data using the source tags; and
return, by the one or more processors, the data values.

17. The system of claim 5,
wherein retrieving data values for the gap includes determining, by the one or more processors, if a summary tag exists with a cycle duration less than the query cycle;
if a summary tag does not exist with a cycle duration less than the query cycle, then further instructions include to determine if a start and an end time aligns with a summary cycle duration;
if the start and the end time do not align with the summary cycle duration, then:
retrieve, by the one or more processors, data values for partial cycles at the start and the end of the query;
retrieve, by the one or more processors, summary tag data for aligned time range;
detect, by the one or more processors, a data gap in the summary tag data.

18. The system of claim 5,
wherein retrieving data values for the gap includes determining, by the one or more processors, if a summary tag exists with a cycle duration less than the query cycle;
if a summary tag does not exist with a summary cycle duration less than the query cycle, then further instructions include to determine if a start and an end time aligns with the summary cycle duration;
if the start and the end time do not align with the summary cycle duration, then:
retrieve, by the one or more processors, summary tag data for aligned time range;
detect data gap in the summary tag data.

19. The system of claim 18,
wherein further instructions include to determine, by the one or more processors, if the summary data gap exist for some summarization cycles;
if the summary data gap does exist for some summarization cycles, further instructions include to:
retrieve, by the one or more processors, data values for all gaps excluding a current summary tag;
return, by the one or more processors, the data values for all gaps.

20. The system of claim 18,
wherein further instructions include to determine, by the one or more processors, if the summary data gap exist for some summarization cycles;
if the summary data gap does not exist for some summarization cycles, further instructions include to:
return, by the one or more processors, the data values.

* * * * *